United States Patent
Akl et al.

(10) Patent No.: US 11,917,698 B2
(45) Date of Patent: Feb. 27, 2024

(54) INTEGRATED ACCESS AND BACKHAUL (IAB) BACKHAUL ADAPTION PROTOCOL (BAP) ROUTING OVER SIDELINK

(71) Applicant: QUALCOMM Incorporated, San Diego, CA (US)

(72) Inventors: Naeem Akl, Somerville, NJ (US); Karl Georg Hampel, Hoboken, NJ (US); Sony Akkarakaran, Poway, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/452,000

(22) Filed: Oct. 22, 2021

(65) Prior Publication Data

US 2023/0128486 A1  Apr. 27, 2023

(51) Int. Cl.
*H04W 76/10* (2018.01)
*H04W 88/04* (2009.01)
*H04W 88/14* (2009.01)
*H04W 92/18* (2009.01)
*H04W 92/24* (2009.01)

(52) U.S. Cl.
CPC ............ *H04W 76/10* (2018.02); *H04W 88/04* (2013.01); *H04W 88/14* (2013.01); *H04W 92/18* (2013.01); *H04W 92/24* (2013.01)

(58) Field of Classification Search
CPC ..... H04W 76/10; H04W 88/04; H04W 88/14; H04W 92/18; H04W 92/24; H04W 40/22
See application file for complete search history.

(56) References Cited

U.S. PATENT DOCUMENTS

| | | | |
|---|---|---|---|
| 2021/0051653 A1* | 2/2021 | Park | H04W 8/22 |
| 2023/0007565 A1* | 1/2023 | Mildh | H04W 40/22 |
| 2023/0017794 A1* | 1/2023 | Fujishiro | H04W 76/30 |
| 2023/0025046 A1 | 1/2023 | Akkarakaran et al. | |
| 2023/0027099 A1 | 1/2023 | Akkarakaran et al. | |

FOREIGN PATENT DOCUMENTS

| | | |
|---|---|---|
| JP | 2021125825 A | 8/2021 |
| WO | WO-2021139675 A1 | 7/2021 |

OTHER PUBLICATIONS

International Search Report and Written Opinion—PCT/US2022/076480—ISA/EPO—dated Jan. 3, 2023.

(Continued)

*Primary Examiner* — Kibrom T Hailu
(74) *Attorney, Agent, or Firm* — Harrity & Harrity, LLP

(57) ABSTRACT

Various aspects of the present disclosure generally relate to wireless communication. In some aspects, a wireless node may communicate, with an integrated access and backhaul (IAB) donor, an indication associated with establishing a sidelink connection between the wireless node and an IAB node. The wireless node may receive, from the IAB donor, a configuration that maps a routing identifier to a route that includes the sidelink connection between the wireless node and the IAB node. Numerous other aspects are described.

30 Claims, 12 Drawing Sheets

(56) References Cited

OTHER PUBLICATIONS

QUALCOMM: "CR to 38.300 on Integrated Access and Backhaul for NR", 3GPP TSG-RAN WG2 Meeting #108, R2-19XXXXX, IAB Running CR for 38300 V3, 3rd Generation Partnership Project, Mobile Competence Centre, 650, Route Des Lucioles, F-06921 Sophia-Antipolis Cedex, France, vol. RAN WG2, No. Reno, NV, USA, Nov. 18, 2019-Nov. 22, 2019, Dec. 16, 2019, XP051841152, 28 Pages, Sections 3.2, 4.x.1, 4.x.2.4.x.3, 6.x, "BAP configuration", Section on p. 21.

\* cited by examiner

INTEGRATED ACCESS AND BACKHAUL (IAB) BACKHAUL ADAPTION PROTOCOL (BAP) ROUTING OVER SIDELINK

FIELD OF THE DISCLOSURE

Aspects of the present disclosure generally relate to wireless communication and to techniques and apparatuses for integrated access and backhaul (IAB) backhaul adaptation protocol (BAP) routing over sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless node. The method may include communicating, with an integrated access and backhaul (IAB) donor, an indication associated with establishing a sidelink connection between the wireless node and an IAB node. The method may include receiving, from the IAB donor, a configuration that maps a routing identifier to a route that includes the sidelink connection between the wireless node and the IAB node.

Some aspects described herein relate to a method of wireless communication performed by an IAB donor. The method may include communicating, with a wireless node, an indication associated with establishing a sidelink connection between the wireless node and an IAB node. The method may include transmitting, to the wireless node, a configuration that maps a routing identifier to a route that includes the sidelink connection between the wireless node and the IAB node.

Some aspects described herein relate to a wireless node for wireless communication. The wireless node may include a memory and one or more processors coupled to the memory. The one or more processors may be configured to communicate, with an IAB donor, an indication associated with establishing a sidelink connection between the wireless node and an IAB node. The one or more processors may be configured to receive, from the IAB donor, a configuration that maps a routing identifier to a route that includes the sidelink connection between the wireless node and the IAB node.

Some aspects described herein relate to an IAB donor for wireless communication. The IAB donor may include a memory and one or more processors coupled to the memory. The one or more processors may be configured to communicate, with a wireless node, an indication associated with establishing a sidelink connection between the wireless node and an IAB node. The one or more processors may be configured to transmit, to the wireless node, a configuration that maps a routing identifier to a route that includes the sidelink connection between the wireless node and the IAB node.

Some aspects described herein relate to a non-transitory computer-readable medium that stores a set of instructions for wireless communication by a wireless node. The set of instructions, when executed by one or more processors of the wireless node, may cause the wireless node to communicate, with an IAB donor, an indication associated with establishing a sidelink connection between the wireless node and an IAB node. The set of instructions, when executed by one or more processors of the wireless node, may cause the wireless node to receive, from the IAB donor, a configuration that maps a routing identifier to a route that includes the sidelink connection between the wireless node and the IAB node.

Some aspects described herein relate to a non-transitory computer-readable medium that stores a set of instructions for an IAB donor. The set of instructions, when executed by one or more processors of the IAB donor, may cause the IAB donor to communicate, with a wireless node, an indication associated with establishing a sidelink connection between the wireless node and an IAB node. The set of instructions, when executed by one or more processors of the IAB donor, may cause the IAB donor to transmit, to the wireless node, a configuration that maps a routing identifier to a route that includes the sidelink connection between the wireless node and the IAB node.

Some aspects described herein relate to an apparatus for wireless communication. The apparatus may include means for communicating, with an IAB donor, an indication associated with establishing a sidelink connection between the apparatus and an IAB node. The apparatus may include means for receiving, from the IAB donor, a configuration that maps a routing identifier to a route that includes the sidelink connection between the apparatus and the IAB node.

Some aspects described herein relate to an apparatus for wireless communication. The apparatus may include means for communicating, with a wireless node, an indication associated with establishing a sidelink connection between the wireless node and an IAB node. The apparatus may include means for transmitting, to the wireless node, a configuration that maps a routing identifier to a route that includes the sidelink connection between the wireless node and the IAB node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
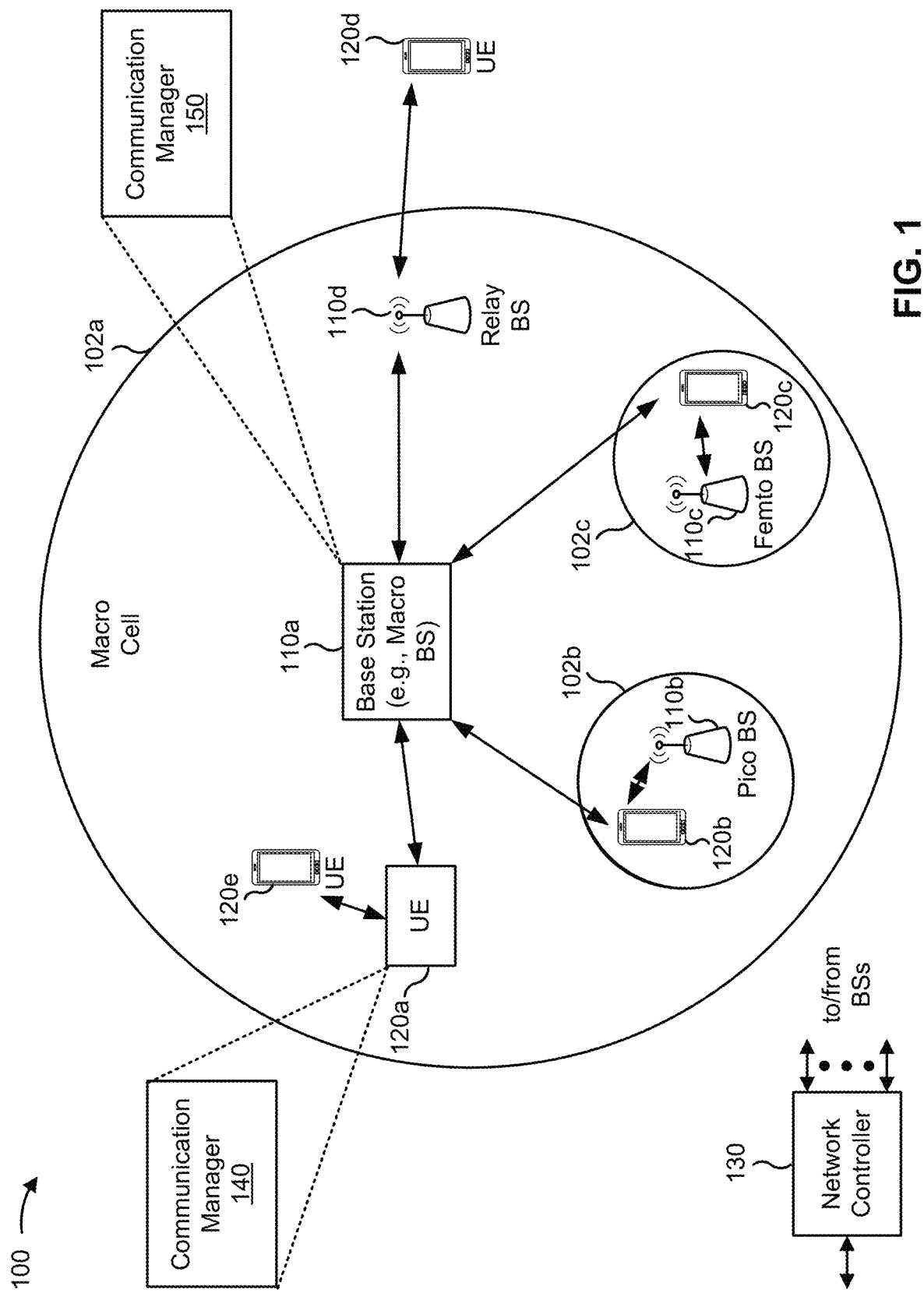
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless node (e.g., a base station 110, a UE 120, or another type of wireless communication device described herein) may include a communication manager 140. As described in more detail elsewhere herein, the communication manager 140 may communicate, with an integrated access and backhaul (IAB) donor (e.g., a base station 110, a UE 120, or another type of wireless communication device described herein), an indication associated with establishing a sidelink connection between the wireless node and an IAB node; and receive, from the IAB donor, a configuration that maps a routing identifier to a route that includes the sidelink connection between the wireless node and the IAB node. Additionally, or alternatively, the communication manager 140 may perform one or more other operations described herein.

In some aspects, an IAB donor (e.g., a base station 110, a UE 120, or another type of wireless communication device described herein) may include a communication manager 150. As described in more detail elsewhere herein, the communication manager 150 may communicate, with a wireless node (e.g., a base station 110, a UE 120, or another type of wireless communication device described herein), an indication associated with establishing a sidelink connection between the wireless node and an IAB node; and transmit, to the wireless node, a configuration that maps a routing identifier to a route that includes the sidelink connection between the wireless node and the IAB node. Additionally, or alternatively, the communication manager 150 may perform one or more other operations described herein.

As indicated above, FIG. 1 is provided as an example. Other examples may differ from what is described with regard to FIG. 1.

Figure 2:
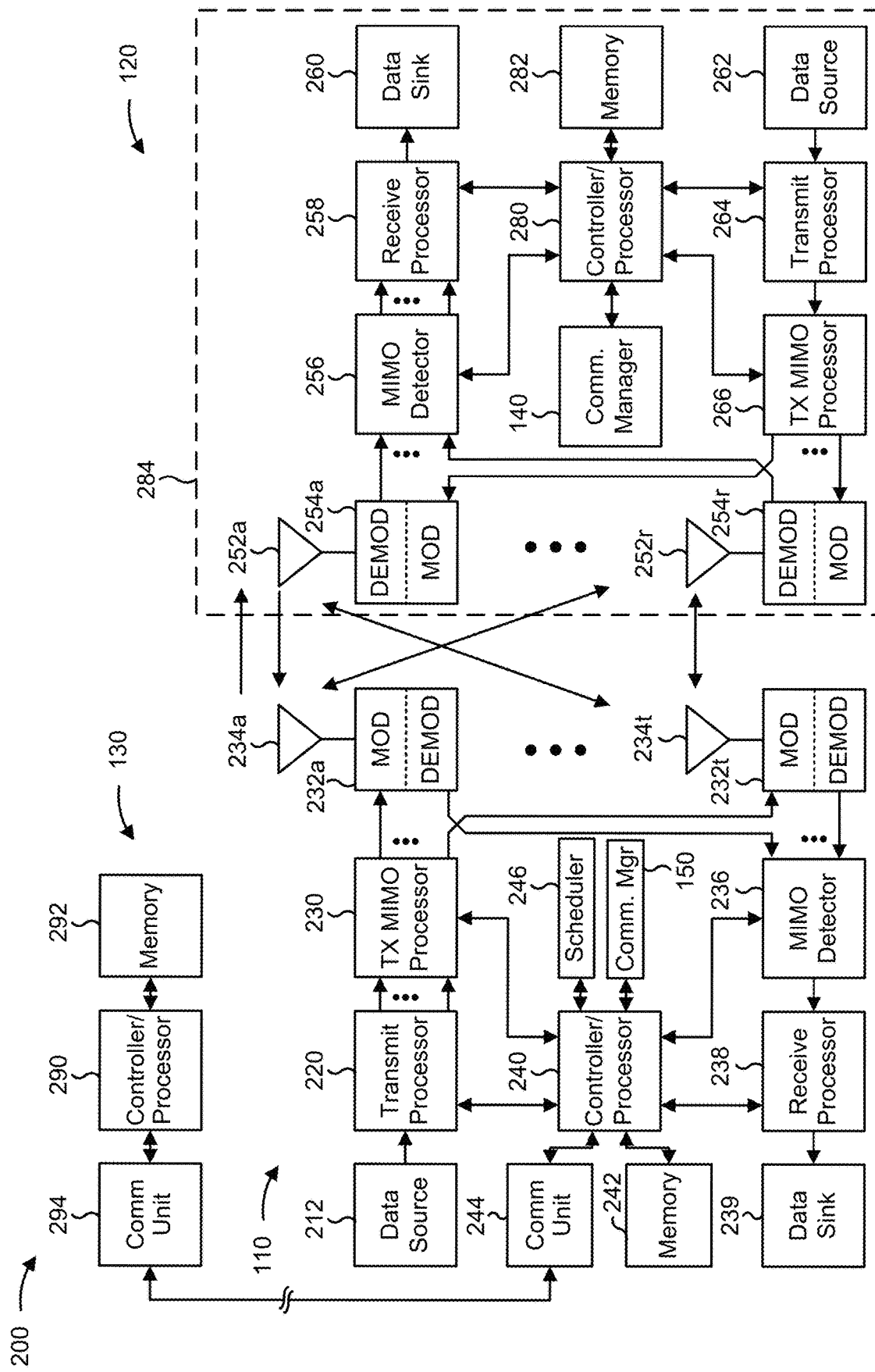
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7A-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7A-11).

The controller/processor 240 of the base station 110, the controller/processor 280 of the UE 120, and/or any other component(s) of FIG. 2 may perform one or more techniques associated with IAB BAP routing over sidelink, as described in more detail elsewhere herein. In some aspects, a wireless node or an IAB donor described herein is the base station 110, is included in the base station 110, or includes one or more components of the base station 110 shown in FIG. 2. In some aspects, a wireless node or an IAB donor described herein is the UE 120, is included in the UE 120, or includes one or more components of the UE 120 shown in FIG. 2. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a wireless node (e.g., a base station 110, a UE 120, or another type of wireless communication device described herein) includes means for communicating, with an IAB donor, an indication associated with establishing a sidelink connection between the wireless node and an IAB node; and/or means for receiving, from the IAB donor, a configuration that maps a routing identifier to a route that includes the sidelink connection between the wireless node and the IAB node. In some aspects, the means for the wireless node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an IAB donor (e.g., a base station 110, a UE 120, or another type of wireless communication device described herein) includes means for communicating, with a wireless node, an indication associated with establishing a sidelink connection between the wireless node and an IAB node; and/or means for transmitting, to the wireless node, a configuration that maps a routing identifier to a route that includes the sidelink connection between the wireless node and the IAB node. In some aspects, the means for the IAB donor to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the IAB node to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
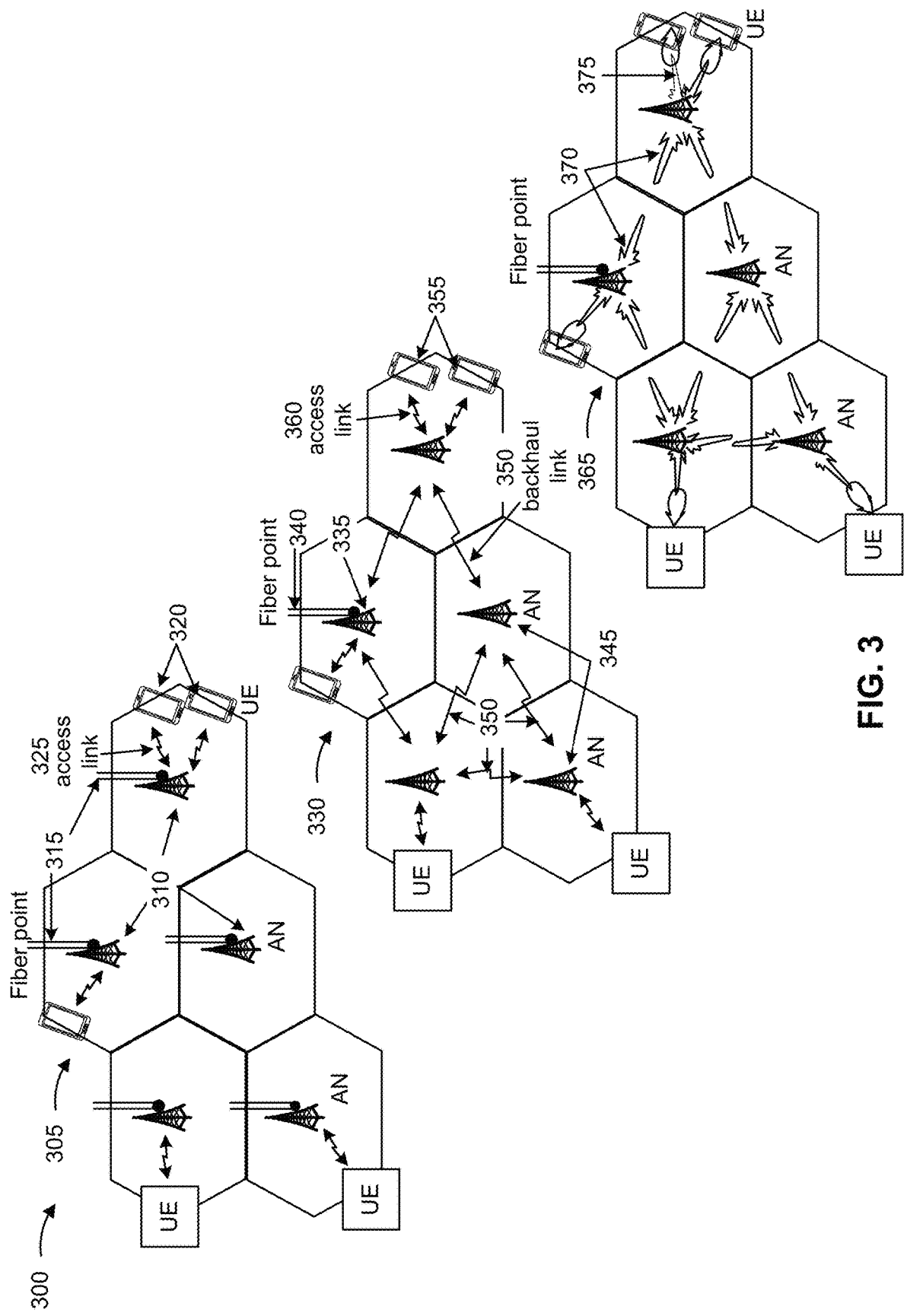
FIG. 3 is a diagram illustrating examples of radio access networks, in accordance with the present disclosure.

FIG. 3 is a diagram illustrating examples 300 of radio access networks, in accordance with the present disclosure.

As shown by reference 305, a traditional (e.g., 3G, 4G, or LTE) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB donor). The IAB network may include one or more non-anchor base stations 345, sometimes referred to as relay base stations or IAB nodes (or IAB nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference 365, in some aspects, a radio access network that includes an IAB network may utilize millimeter wave technology and/or directional communications (e.g., beamforming) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network or a device-to-device network). In this case, "anchor node" may refer to a UE that is directly in communication with a base station (e.g., an anchor base station or a non-anchor base station).

In some aspects, IAB BAP routing over sidelink, as described herein, may be configured for and performed in an IAB network described in association with FIG. 3.

As indicated above, FIG. 3 is provided as an example. Other examples may differ from what is described with regard to FIG. 3.

Figure 4:
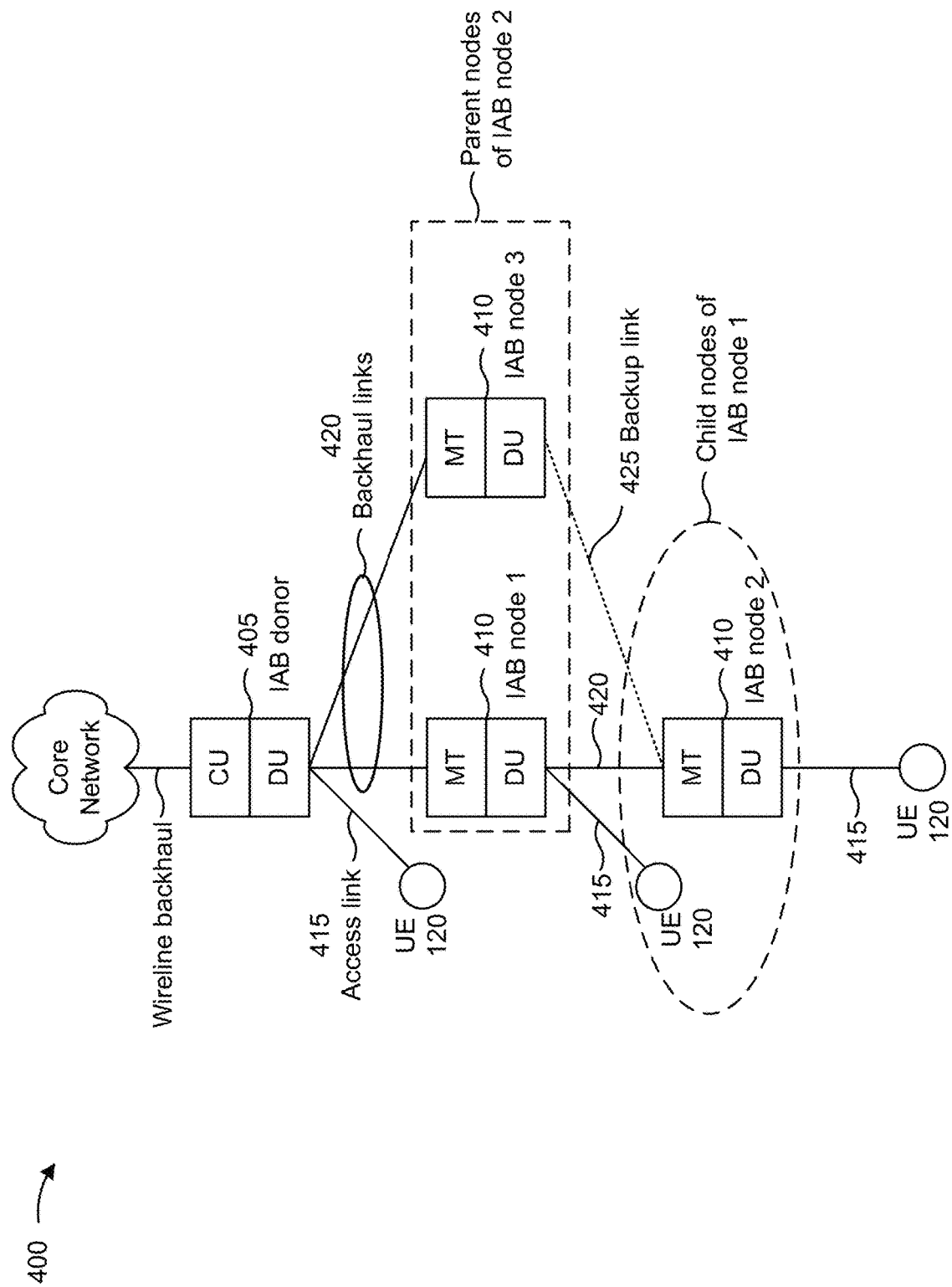
FIG. 4 is a diagram illustrating an example of an integrated access and backhaul (IAB) network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station 335, as described above in connection with FIG. 3. As shown, an IAB donor 405 may include a central unit (CU), which may perform access node controller (ANC) functions and/or AMF functions. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message or an F1 application protocol (F1-AP) message).

As further shown in FIG. 4, the IAB network may include IAB nodes 410 (shown as IAB node 1, IAB node 2, and IAB node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, and/or spatial resources) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, and/or becomes overloaded, among other examples. For example, a backup link 425 between IAB node 2 and IAB node 3 may be used for backhaul communications if a primary backhaul link between IAB node 2 and IAB node 1 fails. As used herein, "node" or "wireless node" may refer to an IAB donor 405 or an IAB node 410.

In some aspects, IAB BAP routing over sidelink, as described herein, may be configured for and performed in an IAB network having the network architecture described in association with FIG. 4.

As indicated above, FIG. 4 is provided as an example. Other examples may differ from what is described with regard to FIG. 4.

Figure 5:
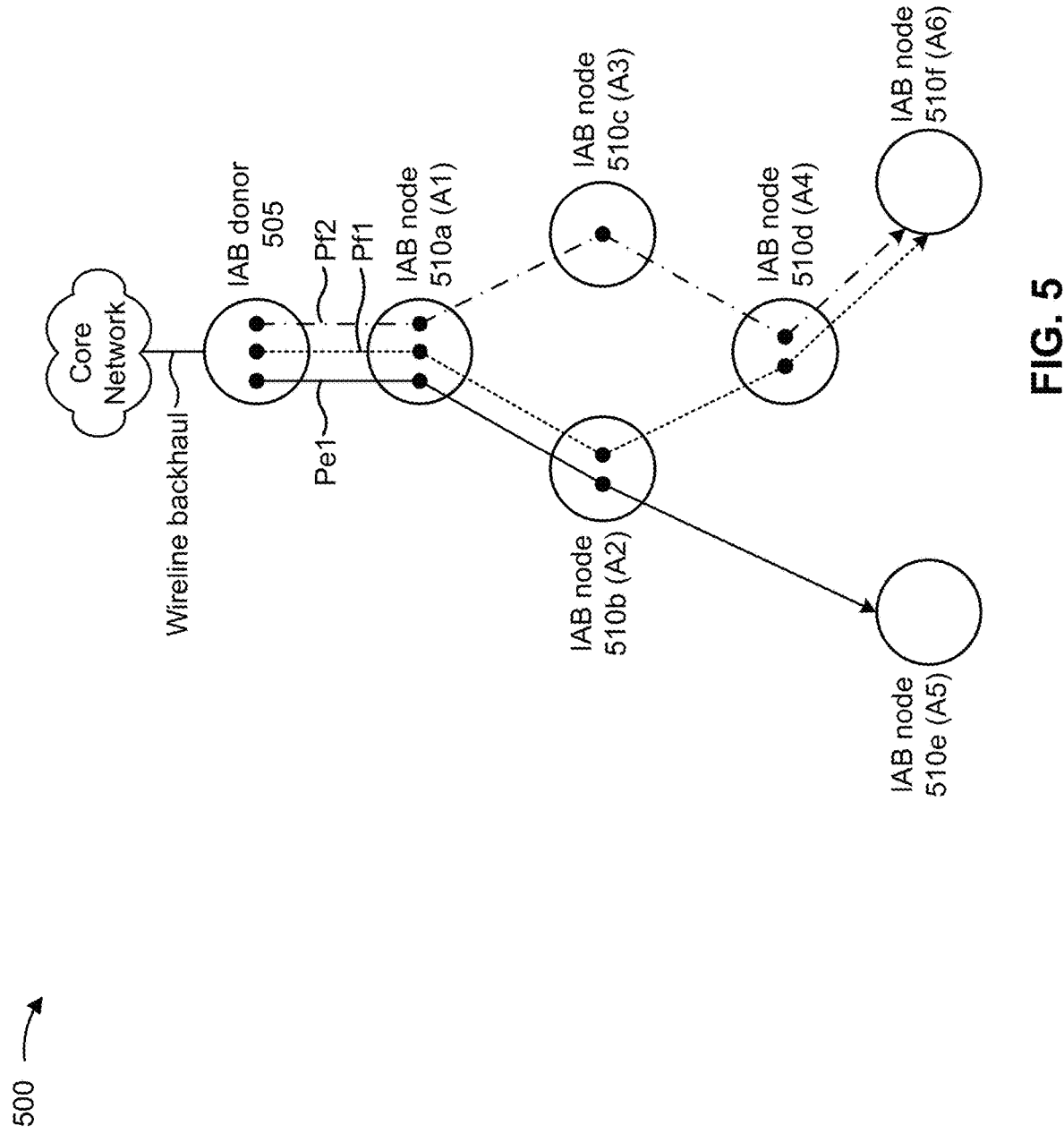
FIG. 5 is a diagram illustrating an example of backhaul adaptation protocol (BAP) routing across a wireless backhaul in accordance with the present disclosure.

FIG. 5 is a diagram illustrating an example 500 of routing across a wireless backhaul such as an IAB network, in accordance with the present disclosure. Example 500 includes an IAB donor 505 (e.g., base station 110, anchor base station 335, a DU of IAB donor 405, or the like), and a set of IAB nodes 510a through 510f (e.g., a set of wireless nodes including one or more base stations 110, UEs 120, anchor base stations 335, non-anchor base stations 345, IAB nodes 410, or the like). Communications may be routed from the IAB donor 505 to an endpoint via one or more of the IAB nodes 510. Backhaul adaptation protocol (BAP) layers of the IAB nodes 510 and the IAB donor 505 may facilitate the routing of such communications, as described below. Each IAB node 510 may be associated with an identifier, herein referred to as a BAP address. For example, IAB node 510a is associated with a BAP address of "A1," IAB node 510b is associated with a BAP address of "A2," and so on. A BAP address may be used to indicate a destination node for a packet. For example, the destination node may an IAB node 510 serving as an access node for a UE 120 (not shown)) in the downstream direction (i.e., from the IAB donor 505 to the UE through one or more IAB nodes 510), or may be the IAB donor 505 in the upstream direction (i.e., from the UE 120 through one or more IAB nodes 510).

A packet may be routed via a path according to the BAP protocol. Three example paths are shown in FIG. 5. The three paths are differentiated from each other by different line patterns. Each path is associated with a path identifier, herein referred to as a BAP path identifier. A given IAB node 510 may be configured with information (referred to herein as a routing configuration) indicating a next hop corresponding to a combination of a given BAP path identifier and a given BAP address. The BAP path identifier can differentiate multiple routes to the same destination node. For example, a first path, shown by a dotted arrow, is associated with a path identifier of Pf1 and a second path, shown by a dotted and dashed arrow, is associated with a BAP path identifier of Pf2. In this case, the first path and the second path both lead to IAB node 510f. By configuring different paths between the same source and destination nodes (e.g., between the IAB donor 505 and the IAB node 510f) using different path identifiers, the IAB donor provides resilience and multiple options for routing to a given destination node (e.g., if a node on the first path fails, the packet can instead be routed via the second path), as well as enabling load balancing across the topology.

A transmitting node (e.g., the IAB donor 505 or an IAB node 510) may generate a packet including a BAP header. For example, the BAP layer of the transmitting node may add the BAP header when the packet enters the BAP layer of the transmitting node from an upper layer. The BAP header may identify a BAP routing identifier. The BAP routing identifier may include a BAP address of a destination node of the packet, as well as a BAP path identifier for a path to the destination node. On intermediate hops, the packet is routed to a next hop based at least in part on the BAP routing identifier and based at least in part on the routing configuration described above. Once the destination node receives the packet, the destination node may identify the packet as destined to the destination node based at least in part on the BAP address identified by the BAP routing identifier.

For example, referring to example 500, a packet generated by the IAB donor 505 may be destined to IAB node 510f. The packet may include a BAP header. The BAP header may identify a BAP routing identifier, which may indicate a BAP address of A6 and a BAP route identifier of Pf1. The IAB donor 505 may transmit the packet to IAB node 510a. IAB node 510a may determine that the packet is not destined to IAB 510a (since the BAP address of A6 does not match IAB node 510a's BAP address of A1). Furthermore, IAB node 510a may be configured with a routing configuration indicating that a next hop associated with the BAP routing identifier is IAB node 510b. IAB node 510b may perform similar operations as IAB node 510a, and may determine, based at least in part on a routing configuration, that the next hop associated with the BAP routing identifier is IAB node 510d. IAB node 510d may perform similar operations as IAB nodes 510a and 510b, and may determine, based at least in part on a routing configuration, that the next hop associated with the BAP routing identifier is IAB node 510f. IAB node 510f may determine that the packet is destined to IAB node 510f (since the BAP address of A6 matches IAB node 510f's BAP address of A6). IAB node 510f may provide a payload of the packet to a UE 120 associated with IAB node 510f (such as a UE 120 to which the packet is destined as identified by the packet).

In some aspects, IAB BAP routing over sidelink, as described herein, may be performed in addition to, in place of, or in conjunction with routing performed across an IAB network as described in association with FIG. 5.

As indicated above, FIG. 5 is provided as an example. Other examples may differ from what is described with regard to FIG. 5.

Figure 6:
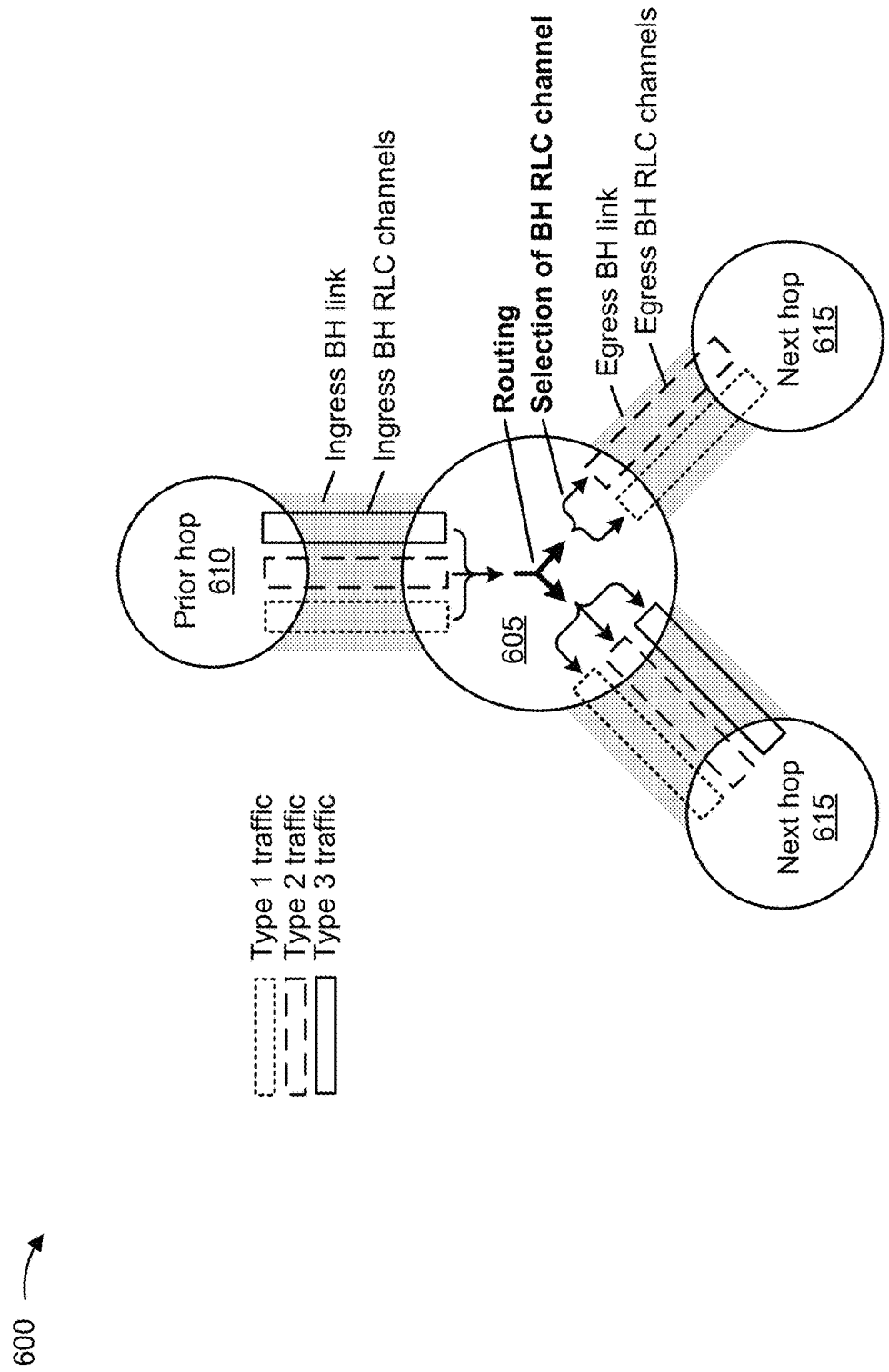
FIG. 6 is a diagram illustrating an example of a radio link control channel configuration for BAP routing, in accordance with the present disclosure.

FIG. 6 is a diagram illustrating an example 600 of an RLC channel configuration for BAP routing, in accordance with the present disclosure. Example 600 illustrates ingress and egress links for a wireless node 605. The wireless node 605 may be on a route associated with BAP routing of packets via a wireless backhaul such as an IAB network. Example 600 also illustrates a wireless node 610 that is a prior hop of the on the route and a pair of wireless nodes 615 that are next hops on the route (e.g., the wireless nodes 615 may be associated with different routes). Each of the wireless nodes 605, 610, and 615 may be, for example, a UE 120, a base station 110, an anchor base station 335, a non-anchor base station 345, an IAB donor 405, an IAB node 410, an IAB donor 505, an IAB node 510, or the like. The wireless nodes 605, 610, and 615 are linked by backhaul (BH) links. For example, a BH link between the wireless node 605 and the wireless node 610 is shown as an ingress BH link (since traffic on the ingress BH link is inbound to the wireless node 605), and BH links between the wireless node 605 and the wireless nodes 615 are shown as egress BH links (since traffic on the egress BH links is outbound from the wireless node 605).

The wireless nodes 605, 610, and 615 may communicate via radio link control (RLC) channels on the various BH links That is, traffic on the ingress link and/or the egress link(s) may be communicated on a BH link via a given RLC channel (herein referred to as a BH RLC channel). A BH RLC channel can be used for transporting (e.g., backhauling) traffic between IAB nodes, or between an IAB donor and an IAB node. A given BH RLC channel may be mapped to one or more UE radio bearers. For example, several UE radio bearers may be multiplexed onto a single BH RLC channel based at least in part on a quality of service (QoS) profile of the UE radio bearers. As another example, a single UE radio bearer may be mapped to a single BH RLC channel, which enables more granular control of QoS profiles and other parameters. Thus, BH RLC channels support backhauling of UE traffic based at least in part on parameters associated with the UE traffic.

In some aspects, a given BH RLC channel is associated with a particular type of traffic. For example, as indicated in FIG. 6, one or more BH RLC channels may be associated with a first type of traffic (Type 1 traffic), one or more BH RLC channels may be associated with a second type of traffic (Type 2 traffic), and one or more BH RLC channels may be associated with a third type of traffic (Type 3 traffic). The type of traffic associated with a given BH RLC channel may include, for example, signaling traffic, best effort traffic, low latency traffic, or another type of traffic. In this way, QoS and traffic prioritization on the backhaul can be enforced through a number of BH RLC channels per backhaul link. Upper layer traffic (e.g., traffic originating from above the RLC layer) may be mapped to a BH RLC channel. For example, upper layer traffic associated with an F1-U interface or an X2-U interface may be mapped at a GTP-U tunnel granularity, upper layer traffic associated with an F1-C interface may be mapped at a granularity of non-UE-associated F1-AP versus UE-associated F1-AP, and non-F1 interface traffic may be mapped at a granularity of a type (e.g., different classes of operations, administration, and management (OAM) traffic). Mapping may occur at an entry point of the traffic to the BAP layer, such as at an access IAB node for uplink traffic or at an IAB donor for downlink traffic. At intermediate hops, egress BH RLC channels may be mapped from ingress BH RLC channels.

In some aspects, IAB BAP routing over sidelink, as described herein, may be performed based at least in part on an RLC channel configuration described in association with FIG. 6.

As indicated above, FIG. 6 is provided as an example. Other examples may differ from what is described with regard to FIG. 6.

Conventionally, a BAP route comprises a sequence of BH links between DUs and MTs. For example, in a downlink direction, a BAP route may include a BH link between a DU of an IAB donor and an MT of a first wireless node (e.g., a first IAB node), and a BH link between a DU of the first wireless node and an MT of a second wireless node (e.g., a second IAB node). In the uplink direction, a BAP route may include a BH link between an MT of a first wireless node and a DU of a second wireless node, and a BH link between an MT of the second wireless node and a DU of an IAB donor. As noted above, MT functionality at a given wireless node is similar to UE functionality. Therefore, in some systems, a sidelink may be established between an MT of a first wireless node and an MT of a second wireless node (e.g., in a manner similar to that in which a sidelink may be established between a pair of UEs). Notably, BAP routing does not currently support the use of a sidelink between MTs of wireless nodes.

Some techniques and apparatuses described herein enable IAB BAP routing over sidelink. Enabling BAP routing over sidelink improves connectivity in an IAB network, which allows for increased robustness and improved load balancing. Notably, a BAP route that utilizes a sidelink may be configured by a CU of an IAB donor, meaning that BAP configurations provided by the CU of the IAB donor to wireless nodes (e.g., IAB nodes) and BAP processing of packets by the wireless nodes with sidelink connections must be configured accordingly.

In some aspects, to enable IAB BAP routing over sidelink, a wireless node may communicate, with an IAB donor, an indication associated with establishing a sidelink connection between the wireless node and an IAB node. In some aspects, the IAB donor may then transmit, and the wireless node may receive, a configuration (e.g., a BAP routing configuration) that maps a routing identifier to a route that includes the sidelink connection between the wireless node and the IAB node. In this way, IAB BAP routing over sidelink can be enabled, thereby improving connectivity in an IAB network and providing increased robustness and improved load balancing in the IAB network. Additional details are provided below.

Figure 7A:
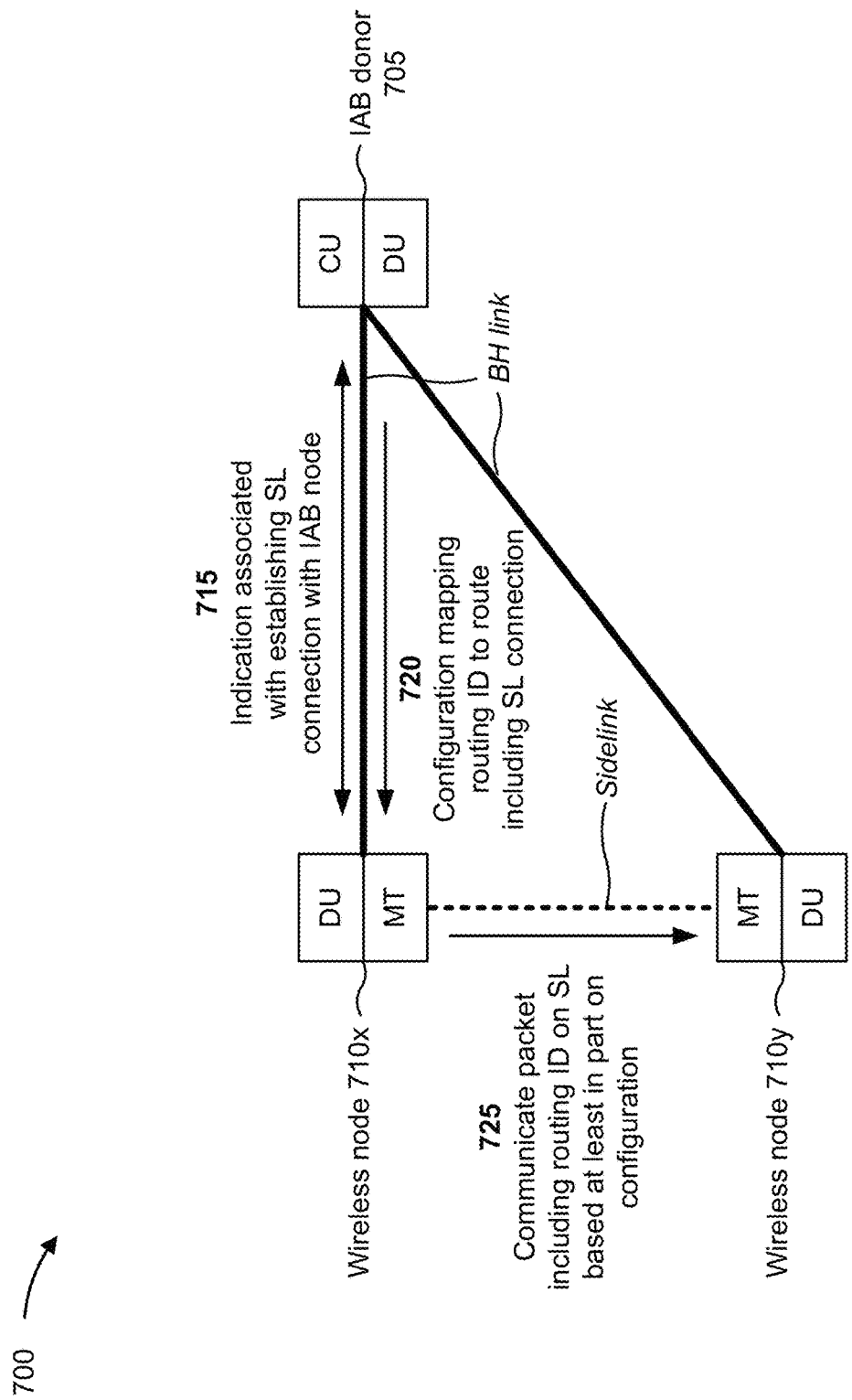
FIGS. 7A and 7B are diagrams illustrating examples associated with IAB BAP routing over sidelink, in accordance with the present disclosure.
Figure 7B:
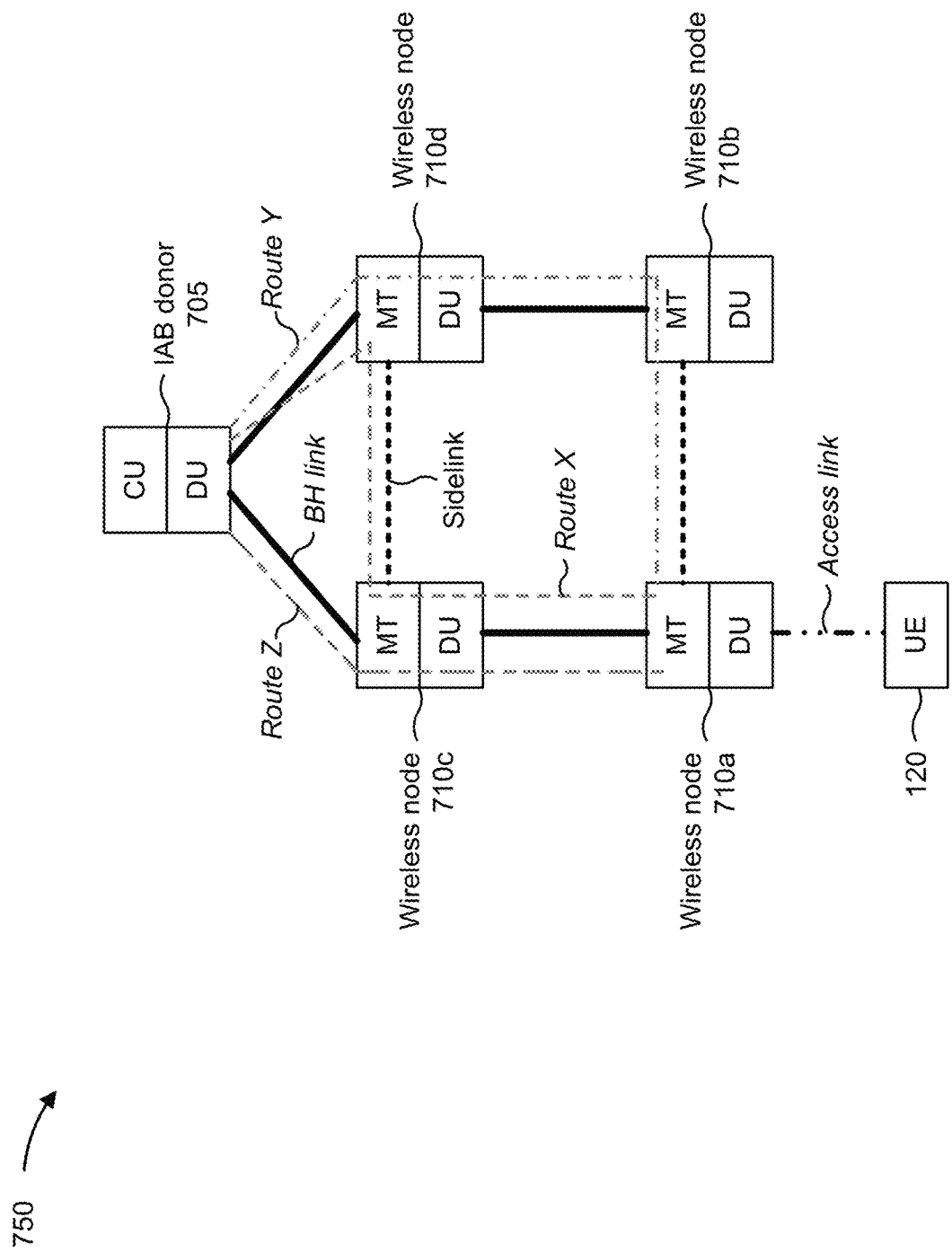

FIGS. 7A and 7B are diagrams illustrating examples 700 and 750, respectively, associated with IAB BAP routing over sidelink, in accordance with the present disclosure.

As shown in FIG. 7A, example 700 includes communication among an IAB donor 705, a wireless node 710x, and a wireless node 710y. The IAB donor 705 may include, for example, a base station 110, an anchor base station 335, an IAB donor 405, an IAB donor 505, an IAB node 510, a wireless node 610, or the like. A wireless node 710 (e.g., the wireless node 710x, the wireless node 710y) may include, for example, a UE 120, a base station 110, an anchor base station 335, a non-anchor base station 345, an IAB donor 405, an IAB node 410, an IAB donor 505, an IAB node 510, a wireless node 605, a wireless node 610, a wireless node 615, or the like. In some aspects, the IAB donor 705, the wireless node 710x, and the wireless node 710y may be included in an IAB network.

As shown in FIG. 7A, the IAB donor 705 and the wireless nodes 710 may communicate over BH links. For example, a DU of the IAB donor 705 and an MT of the wireless node 710x may communicate over a BH link for uplink and downlink communications, the DU of the IAB donor 705 and an MT of the wireless node 710y may communicate over a BH link for uplink and downlink communications. In some aspects, a sidelink may be established between the wireless nodes 710. For example, as shown in FIG. 7A, a sidelink may be established between the MT of the wireless node 710x and the MT of the wireless node 710y. In some aspects, such sidelinks may be utilized for BAP routing, as described herein. Notably, in some aspects, there may be no BH link between the DU of the IAB donor 705 and the MT of the wireless node 710y. That is, in some aspects, the MT of the wireless node 710y may have the sidelink with the MT of the wireless node 710x, but may not have a BH link with the DU of the IAB donor 705.

In some aspects, a wireless node 710 and the IAB donor 705 may communicate an indication associated with establishing a sidelink connection. For example, as shown by reference 715 in FIG. 7A, the wireless node 710x and the IAB donor 705 may communicate an indication associated with establishing a sidelink connection between the wireless node 710x and the wireless node 710y. In some aspects, the indication serves to inform the IAB donor 705 of the sidelink connection between the wireless node 710x and the wireless node 710y to enable the IAB donor 705 to generate or provide a routing configuration that includes a route comprising the sidelink connection.

In some aspects, communicating the indication includes the wireless node 710x transmitting, and the IAB donor 705 receiving, an indication that the sidelink connection between the wireless node 710x and the wireless node 710y has been established. That is, in some aspects, the wireless node 710x may transmit, and the IAB donor 705 (e.g., a CU of the IAB donor 705) may receive, an indication that the wireless node 710x has established a sidelink connection with the wireless node 710y. In this example, the wireless node 710x is informing the IAB donor 705 of the sidelink connection (e.g., after the sidelink connection is established).

Alternatively, in some aspects, communicating the indication includes the IAB donor 705 transmitting, and the wireless node 710x receiving, an indication to establish the sidelink connection between the wireless node 710x and the wireless node 710y. That is, in some aspects, the IAB donor 705 may transmit, and the wireless node 710x may receive, an indication that the wireless node 710x is to establish a sidelink connection with the wireless node 710y. In this example, the wireless node 710x receives the indication, and may establish the sidelink connection with the wireless node 710y accordingly.

As shown by reference 720, the IAB donor 705 may transmit, and the wireless node 710x may receive, a configuration that maps a routing identifier to a route that includes the sidelink connection between the wireless node 710x and the wireless node 710y. That is, the IAB donor 705 may transmit, and the wireless node 710x may receive, a routing configuration that configures a route that includes the sidelink connection between the wireless node 710x and the wireless node 710y. In some aspects, the IAB donor 705 transmits, and the wireless node 710x receives, the configuration via radio resource control (RRC) signaling, an F1 interface, or the like.

In some aspects, the route that includes the sidelink connection may include a second connection between the wireless node 710x and another wireless node 710z (not shown) (e.g., a UE 120, a base station 110, an anchor base station 335, a non-anchor base station 345, an IAB donor 405, an IAB node 410, an IAB donor 505, an IAB node 510, a wireless node 605, a wireless node 610, a wireless node 615, or the like). In such a case, the configuration may indicate a mapping between the sidelink connection and the second connection. That is, in some aspects, the configuration may indicate a mapping between the sidelink connection and the second connection between the wireless node 710x and the wireless node 710z, where the route indicated by the routing identifier comprises the sidelink connection and the second connection. In some aspects, the second connection may be a Uu link connection. In some aspects, the second connection may be another sidelink connection.

Further, in some aspects, the sidelink connection may be an egress link of the wireless node 710x, and the second connection may be an ingress link of the wireless node 710x. Alternatively, the sidelink connection may be an ingress link of the wireless node 710x, and the second connection may be an egress link of the wireless node 710x. In other words, the sidelink connection may be one of an egress link or an ingress link of the wireless node 710x, and the second connection may be the other of an egress link or an ingress link of the wireless node 710x.

In some aspects, the configuration may be a BAP configuration. In such a case, in some aspects, the routing identifier may include a BAP routing identifier, a BAP address, or a BAP path identifier. Notably, in some aspects, the configuration may be a type of routing configuration other than a BAP configuration.

In some aspects, the configuration identifies the sidelink connection using a destination identity associated with the wireless node 710y. That is, in some aspects, the configuration may identify the sidelink connection using a destination identity of the wireless node 710y (e.g., an MT of the wireless node 710y). In such a case, the wireless node 710x may receive (e.g., from the CU of the IAB donor 705, from the wireless node 710y, or the like) an indication of the destination identity associated with the wireless node 710y. That is, if the configuration identifies the sidelink connection using a destination identity of the wireless node 710y, then the wireless node 710x may receive the destination identity (e.g., a BAP address) of the wireless node 710y from the wireless node 710y or from the IAB donor 705.

In some aspects, the configuration indicates a mapping of a traffic type to the routing identifier. That is, in some aspects, the configuration may indicate a mapping of a traffic type to the routing identifier of the route comprising the sidelink connection. The traffic type may include, for example, Uu bearer traffic, PC5 bearer traffic, F1 user plane (F1-U) tunnel traffic, F1 control plane (F1-C) signalling traffic, non-F1 traffic, one or more Internet protocol (IP) header fields of a traffic flow, or the like.

In some aspects, the configuration indicates a mapping to or from a channel of a plurality of channels associated with the sidelink connection. In some aspects, the mapping is associated with a traffic type, or may be associated with a channel of a second connection between the wireless node 710x and another wireless node 710. In some aspects, the channel may be, for example, a BH RLC channel, a Uu RLC channel or logical channel, a PC5 RLC channel or logical channel, or the like.

In some aspects, the route further includes a Uu link connection. That is, in some aspects, the route that includes the sidelink connection between the wireless node 710x and the wireless node 710y may include a connection over a Uu link.

As shown by reference 725, in some aspects, the wireless node 710x may communicate a packet including the routing identifier on the sidelink connection based at least in part on the configuration. For example, the wireless node 710x may receive a packet including the routing identifier. As described above, the configuration maps the routing identifier to the route that includes the sidelink connection between the wireless node 710x and the wireless node 710y. Here, the wireless node 710 may transmit the packet on the sidelink connection according to the configuration based at least in part on the routing identifier.

In some aspects, the route includes a second connection between the wireless node 710x and the wireless node 710y. For example, the route may include the sidelink connection between the wireless node 710x and the wireless node 710y, and may also include a Uu connection between the wireless node 710x and the wireless node 710y.

In some aspects, the configuration does not indicate that either the sidelink connection or the second connection is to be used for the route. In such a case, the wireless node 710 may communicate a packet including the routing identifier on the sidelink connection or the second connection (e.g., on the sidelink connection only, on the Uu connection only, or on both the sidelink connection and the Uu connection). That is, when the configuration does not indicate mapping to a particular connection to be used for the route, the wireless node 710x may route traffic to/from the wireless node 710y node using either or both of the sidelink and Uu connections (e.g., randomly, according to a pre-configured order, or the like).

Conversely, in some aspects, the configuration indicates that at least one of the sidelink connection or the second connection is to be used for the route. In such a case, the wireless node 710x may communicate a packet including the routing identifier on the sidelink connection or the second connection according to the configuration. That is, when the configuration indicates mapping to one or both of the connections to use for the route, the wireless node 710x may route traffic to/from the wireless node 710y using the connection(s) as indicated in the configuration. In some aspects, the connection(s) may be indicated using a first routing identifier, path identifier, or next-hop address (e.g., a BAP address, a Layer 2 (L2) address, or the like) for the Uu connection and a second routing identifier, path identifier, or next-hop address for the sidelink connection. Additionally, or alternatively, the connection(s) may be indicated using a first channel identifier (e.g., ingress or egress) of a transport channel of the Uu connection and a second channel identifier of a transport channel of the sidelink connection.

FIG. 7B is a diagram of an example 750 associated with IAB BAP routing configuration. As shown in FIG. 7B, example 750 includes communication among an IAB donor 705, a group of wireless nodes 710, and a UE 120. The IAB donor 705 may include, for example, a base station 110, an anchor base station 335, an IAB donor 405, an IAB donor 505, an IAB node 510, a wireless node 610, or the like. A wireless node 710 may include, for example, a UE 120, a base station 110, an anchor base station 335, a non-anchor base station 345, an IAB donor 405, an IAB node 410, an IAB donor 505, an IAB node 510, a wireless node 605, a wireless node 610, a wireless node 615, or the like. In some aspects, the IAB donor 705 and the group of wireless nodes 710 may be included in an IAB network.

As shown in FIG. 7B, the IAB donor 705 and the wireless nodes 710 may communicate over BH links. For example, a DU of the IAB donor 705 and an MT of the wireless node 710c may communicate over a BH link for uplink and downlink communications, a DU of the wireless node 710c and an MT of the wireless node 710a may communicate over a BH link for uplink and downlink communications, the DU of the IAB donor 705 and an MT of the wireless node 710d may communicate over a BH link for uplink and downlink communications, and a DU of the wireless node 710d and an MT of the wireless node 710b may communicate over a BH link for uplink and downlink communications. As further shown, the UE 120 and the wireless node 710a may communicate over an access link. For example, the UE 120 (which has MT functionality) and a DU of the wireless node 710a may communicate over an access link.

As further shown in FIG. 7B, sidelinks may be established among the wireless nodes 710. For example, in example 750, a first sidelink may be established between the MT of the wireless node 710c and the MT of the wireless node 710d, and a second sidelink may be established between the MT of the wireless node 710a and the MT of the wireless node 710b. In some aspects, such sidelinks may be utilized for BAP routing, as described herein.

In example 750, the various wireless nodes 710 and the IAB donor 705 may communicate indications associated with establishing the sidelink connections (e.g., in a manner similar to that described above with respect to example 700). For example, the wireless node 710a and the IAB donor 705 may communicate an indication associated with establishing the second sidelink connection between the wireless node 710a and the wireless node 710b. As another example, the wireless node 710d and the IAB donor 705 may communicate an indication associated with establishing the first sidelink connection between the wireless node 710c and the wireless node 710d.

In some aspects, the IAB donor 705 may transmit, and the various wireless nodes 710 may receive, configurations that map one or more routing identifiers to one or more routes that include the first sidelink connection or the second sidelink connection. That is, the IAB donor 705 may transmit, and the wireless nodes 710 may receive, routing configurations that configure one or more routes that include at least one of the first sidelink connection and the second sidelink connection (e.g., in a manner similar to that described above with respect to example 700).

For example, the IAB donor 705 may transmit configurations defining a route X that includes the first sidelink connection (e.g., the sidelink connection between the wireless node 710*c* and the wireless node 710*d*), a route Y that includes the second sidelink connection (e.g., the sidelink connection between the wireless node 710*a* and the wireless node 710*b*), and a route Z that does not include either the first sidelink connection or the second sidelink connection. Packets can be routed along the various routes (e.g., over a sidelink connection) according to the configurations. In this way, IAB BAP routing over sidelink can be supported in an IAB network.

In example 750, similar to example 700, the IAB donor 705 provides a routing configuration based on which a packet is routed to or from a sidelink connection. Notably, at an intermediate node (e.g., wireless node 710*b*, wireless node 710*c*, or wireless node 710*d*), routing may be between a sidelink connection and another sidelink connection or a BH link connection (e.g., a Uu link). Further, at an access node (e.g., wireless node 710*a*) mapping of a traffic type to a sidelink connection is performed. Further, in example 750, similar to example 700, the configuration provided by the IAB donor 705 may include a channel mapping configuration. Here, at an intermediate node, mapping is performed between channels of a pair of connections, at least one of which may be a sidelink connection. Further, at an access node, mapping of a traffic type to a channel on a sidelink connection is performed.

As indicated above, FIGS. 7A and 7B are provided as examples. Other examples may differ from what is described with respect to FIGS. 7A and 7B.

Figure 8:
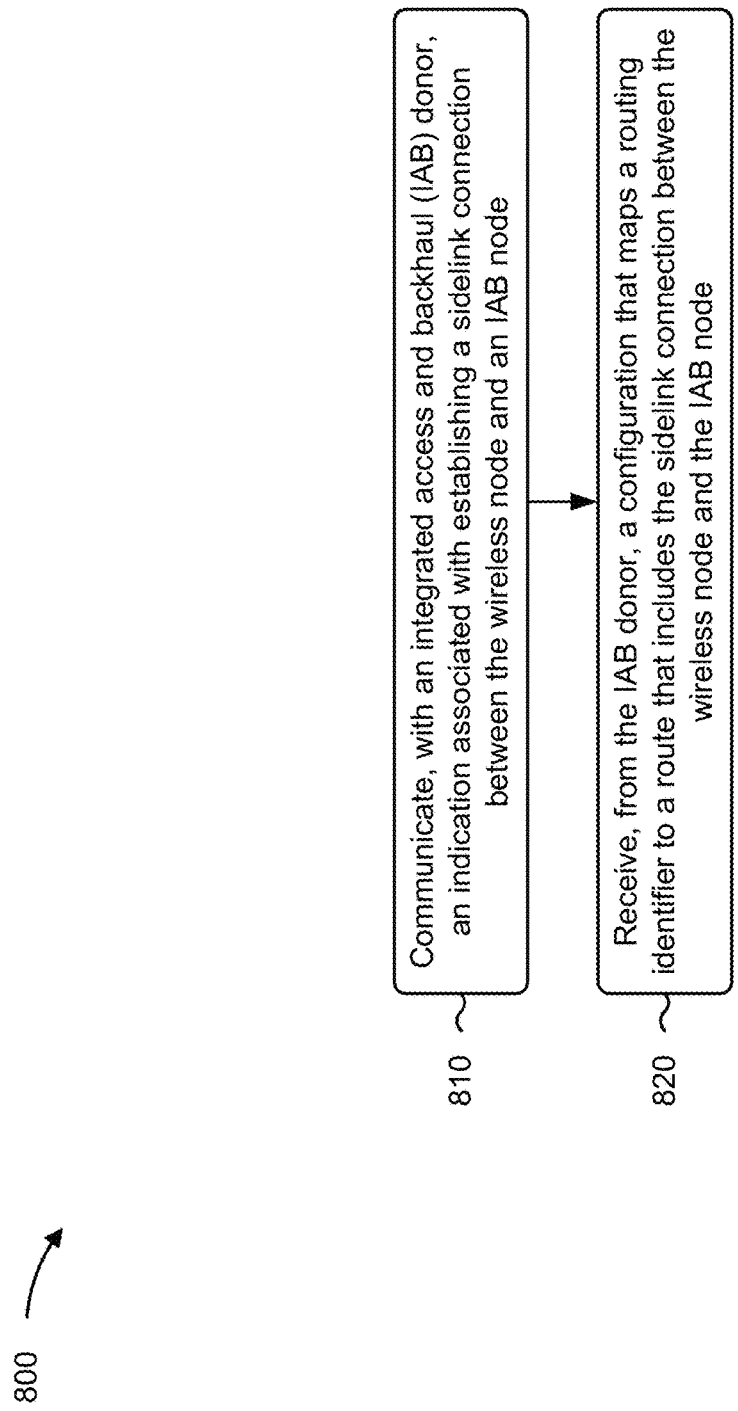
FIGS. 8 and 9 are diagrams illustrating example processes associated with IAB BAP routing over sidelink, in accordance with the present disclosure.

FIG. 8 is a diagram illustrating an example process 800 performed, for example, by a wireless node, in accordance with the present disclosure. Example process 800 is an example where the wireless node (e.g., wireless node 710) performs operations associated with IAB BAP routing over sidelink.

As shown in FIG. 8, in some aspects, process 800 may include communicating, with an IAB donor, an indication associated with establishing a sidelink connection between the wireless node and an IAB node (block 810). For example, the wireless node (e.g., using communication manager 140, reception component 1002 and/or transmission component 1004, depicted in FIG. 10) may communicate, with an IAB donor (e.g., IAB donor 705), an indication associated with establishing a sidelink connection between the wireless node and an IAB node (e.g., another wireless node 710), as described above.

As further shown in FIG. 8, in some aspects, process 800 may include receiving, from the IAB donor, a configuration that maps a routing identifier to a route that includes the sidelink connection between the wireless node and the IAB node (block 820). For example, the wireless node (e.g., using communication manager 140 and/or reception component 1002, depicted in FIG. 10) may receive, from the IAB donor, a configuration that maps a routing identifier to a route that includes the sidelink connection between the wireless node and the IAB node, as described above.

Process 800 may include additional aspects, such as any single aspect or any combination of aspects described below and/or in connection with one or more other processes described elsewhere herein.

In a first aspect, communicating the indication associated with establishing the sidelink connection between the wireless node and the IAB node comprises transmitting an indication that the sidelink connection between the wireless node and the IAB node has been established.

In a second aspect, alone or in combination with the first aspect, communicating the indication associated with establishing the sidelink connection between the wireless node and the IAB node comprises receiving an indication to establish the sidelink connection between the wireless node and the IAB node.

In a third aspect, alone or in combination with one or more of the first and second aspects, process 800 includes communicating a packet including the routing identifier on the sidelink connection based at least in part on the configuration.

In a fourth aspect, alone or in combination with one or more of the first through third aspects, the route includes a second connection between the wireless node and a second IAB node, and the configuration indicates a mapping between the sidelink connection and the second connection.

In a fifth aspect, alone or in combination with one or more of the first through fourth aspects, the second connection is a Uu link connection.

In a sixth aspect, alone or in combination with one or more of the first through fifth aspects, the second connection is a second sidelink connection.

In a seventh aspect, alone or in combination with one or more of the first through sixth aspects, the sidelink connection is an egress link of the wireless node and the second connection is an ingress link of the wireless node.

In an eighth aspect, alone or in combination with one or more of the first through seventh aspects, the sidelink connection is an ingress link of the wireless node and the second connection is an egress link of the wireless node.

In a ninth aspect, alone or in combination with one or more of the first through eighth aspects, the configuration is a BAP configuration.

In a tenth aspect, alone or in combination with one or more of the first through ninth aspects, the routing identifier includes at least one of a BAP routing identifier, a BAP address, or a BAP path identifier.

In an eleventh aspect, alone or in combination with one or more of the first through tenth aspects, the configuration identifies the sidelink connection using a destination identity associated with the IAB node.

In a twelfth aspect, alone or in combination with one or more of the first through eleventh aspects, process 800 includes receiving an indication of the destination identity associated with the IAB node.

In a thirteenth aspect, alone or in combination with one or more of the first through twelfth aspects, the configuration indicates a mapping of a traffic type to the routing identifier.

In a fourteenth aspect, alone or in combination with one or more of the first through thirteenth aspects, the configuration indicates a mapping to or from a channel of a plurality of channels associated with the sidelink connection.

In a fifteenth aspect, alone or in combination with one or more of the first through fourteenth aspects, the mapping is associated with a traffic type.

In a sixteenth aspect, alone or in combination with one or more of the first through fifteenth aspects, the mapping is associated with a channel of a second connection between the wireless node and a second IAB node.

In a seventeenth aspect, alone or in combination with one or more of the first through sixteenth aspects, the route further comprises a Uu link connection.

In an eighteenth aspect, alone or in combination with one or more of the first through seventeenth aspects, the wireless node is another IAB node.

In a nineteenth aspect, alone or in combination with one or more of the first through eighteenth aspects, the wireless node is a user equipment.

In a twentieth aspect, alone or in combination with one or more of the first through nineteenth aspects, the wireless node is a base station.

In a twenty-first aspect, alone or in combination with one or more of the first through twentieth aspects, the configuration is received via RRC signaling.

In a twenty-second aspect, alone or in combination with one or more of the first through twenty-first aspects, the configuration is received via an F1 interface.

In a twenty-third aspect, alone or in combination with one or more of the first through twenty-second aspects, the route includes a second connection between the wireless node and the IAB node and the configuration does not indicate that either the sidelink connection or the second connection is to be used for the route, and process 800 includes communicating a packet including the routing identifier on at least one of the sidelink connection or the second connection.

In a twenty-fourth aspect, alone or in combination with one or more of the first through twenty-third aspects, the route includes a second connection between the wireless node and the IAB node and the configuration indicates that at least one of the sidelink connection or the second connection is to be used for the route, and process 800 includes communicating a packet including the routing identifier on the at least one of the sidelink connection or the second connection according to the configuration.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
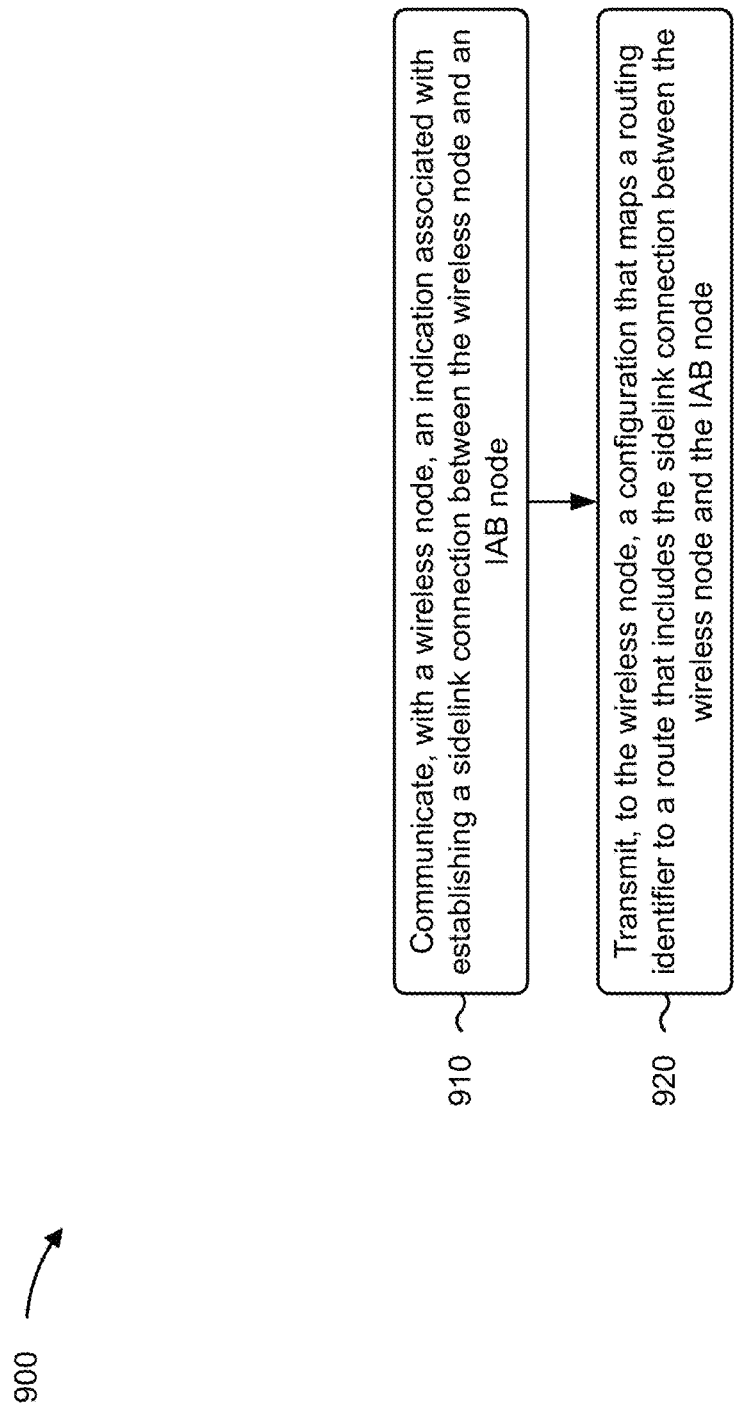

FIG. 9 is a diagram illustrating an example process 900 performed, for example, by an IAB donor, in accordance with the present disclosure. Example process 900 is an example where the IAB donor (e.g., IAB donor 705) performs operations associated with IAB BAP routing over sidelink.

As shown in FIG. 9, in some aspects, process 900 may include communicating, with a wireless node, an indication associated with establishing a sidelink connection between the wireless node and an IAB node (block 910). For example, the IAB donor (e.g., using communication manager 150, reception component 1102, and/or transmission component 1104, depicted in FIG. 11) may communicate, with a wireless node (e.g., a wireless node 710), an indication associated with establishing a sidelink connection between the wireless node and an IAB node (e.g., another wireless node 710), as described above.

As further shown in FIG. 9, in some aspects, process 900 may include transmitting, to the wireless node, a configuration that maps a routing identifier to a route that includes the sidelink connection between the wireless node and the IAB node (block 920). For example, the IAB donor (e.g., using communication manager 150 and/or transmission component 1104, depicted in FIG. 11) may transmit, to the wireless node, a configuration that maps a routing identifier to a route that includes the sidelink connection between the wireless node and the IAB node, as described above.

Process 900 may include additional aspects, such as any single aspect or any combination of aspects described below and/or in connection with one or more other processes described elsewhere herein.

In a first aspect, communicating the indication associated with establishing the sidelink connection between the wireless node and the IAB node comprises receiving an indication that the sidelink connection between the wireless node and the IAB node has been established.

In a second aspect, alone or in combination with the first aspect, communicating the indication associated with establishing the sidelink connection between the wireless node and the IAB node comprises transmitting an indication to establish the sidelink connection between the wireless node and the IAB node.

In a third aspect, alone or in combination with one or more of the first and second aspects, the route includes a second connection between the wireless node and a second IAB node, and the configuration indicates a mapping between the sidelink connection and the second connection.

In a fourth aspect, alone or in combination with one or more of the first through third aspects, the second connection is a Uu link connection.

In a fifth aspect, alone or in combination with one or more of the first through fourth aspects, the second connection is a second sidelink connection.

In a sixth aspect, alone or in combination with one or more of the first through fifth aspects, the sidelink connection is an egress link of the wireless node and the second connection is an ingress link of the wireless node.

In a seventh aspect, alone or in combination with one or more of the first through sixth aspects, the sidelink connection is an ingress link of the wireless node and the second connection is an egress link of the wireless node.

In an eighth aspect, alone or in combination with one or more of the first through seventh aspects, the configuration is a BAP configuration.

In a ninth aspect, alone or in combination with one or more of the first through eighth aspects, the routing identifier includes at least one of a BAP routing identifier, a BAP address, or a BAP path identifier.

In a tenth aspect, alone or in combination with one or more of the first through ninth aspects, the configuration identifies the sidelink connection using a destination identity associated with the IAB node.

In an eleventh aspect, alone or in combination with one or more of the first through tenth aspects, process 900 includes transmitting an indication of the destination identity associated with the IAB node.

In a twelfth aspect, alone or in combination with one or more of the first through eleventh aspects, the configuration indicates a mapping of a traffic type to the routing identifier.

In a thirteenth aspect, alone or in combination with one or more of the first through twelfth aspects, the configuration indicates a mapping to or from a channel of a plurality of channels associated with the sidelink connection.

In a fourteenth aspect, alone or in combination with one or more of the first through thirteenth aspects, the mapping is associated with a traffic type.

In a fifteenth aspect, alone or in combination with one or more of the first through fourteenth aspects, the mapping is associated with a channel of a second connection between the wireless node and a second IAB node.

In a sixteenth aspect, alone or in combination with one or more of the first through fifteenth aspects, the route further comprises a Uu link connection.

In a seventeenth aspect, alone or in combination with one or more of the first through sixteenth aspects, the wireless node is another IAB node.

In an eighteenth aspect, alone or in combination with one or more of the first through seventeenth aspects, the wireless node is a user equipment.

In a nineteenth aspect, alone or in combination with one or more of the first through eighteenth aspects, the wireless node is a base station.

In a twentieth aspect, alone or in combination with one or more of the first through nineteenth aspects, the configuration is transmitted via RRC signaling.

In a twenty-first aspect, alone or in combination with one or more of the first through twentieth aspects, the configuration is transmitted via an F1 interface.

In a twenty-second aspect, alone or in combination with one or more of the first through twenty-first aspects, the route includes a second connection between the wireless node and the IAB node, and the configuration does not indicate that either the sidelink connection or the second connection is to be used for the route.

In a twenty-third aspect, alone or in combination with one or more of the first through twenty-second aspects, the route includes a second connection between the wireless node and the IAB node, and the configuration indicates that at least one of the sidelink connection or the second connection is to be used for the route.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
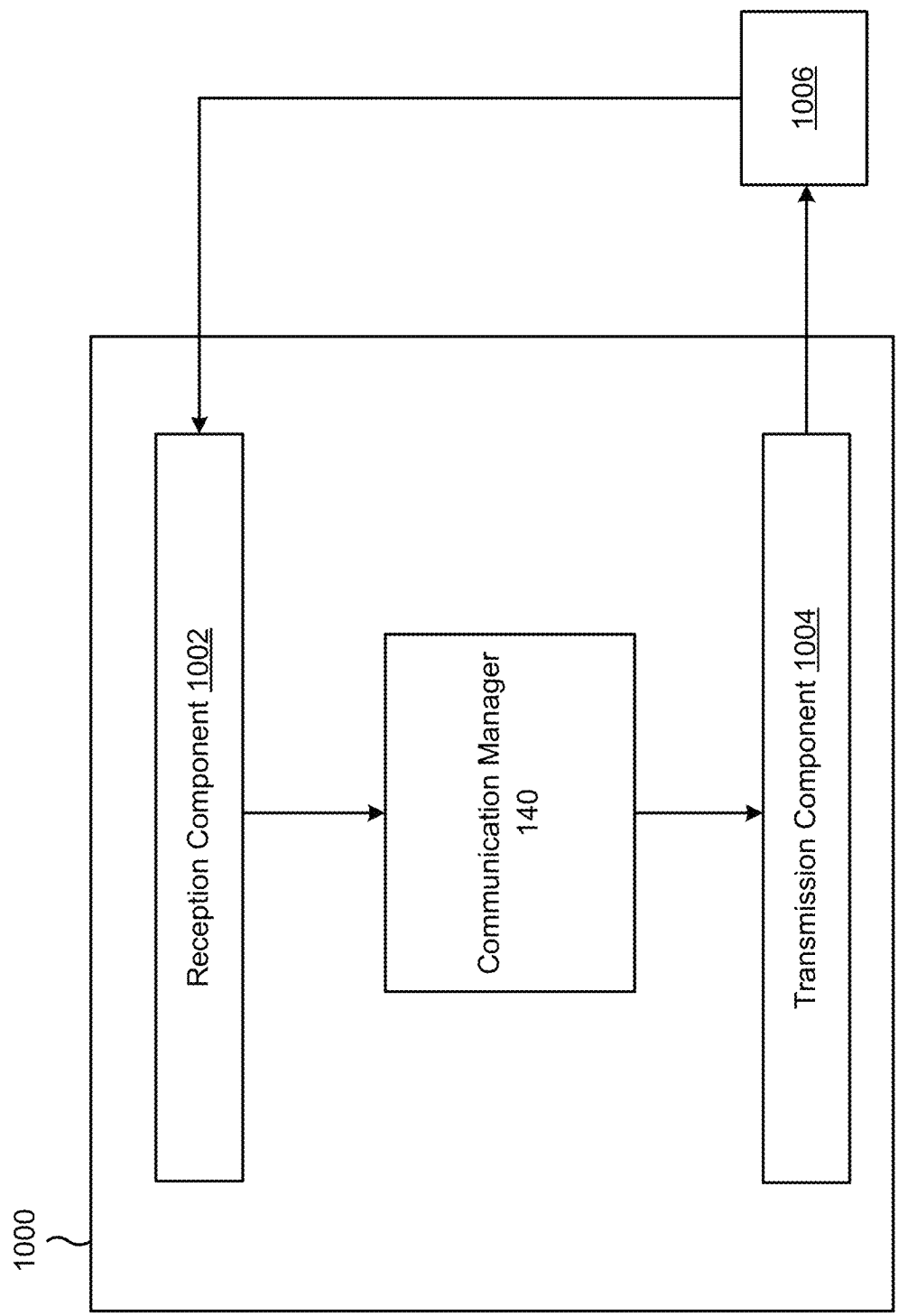
FIGS. 10 and 11 are diagrams of example apparatuses for wireless communication, in accordance with the present disclosure.

FIG. 10 is a diagram of an example apparatus 1000 for wireless communication. The apparatus 1000 may be a wireless node, or a wireless node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as an IAB donor, an IAB node, a wireless node, a UE, a base station, or another wireless communication device) using the reception component 1002 and the transmission component 1004. As further shown, the apparatus 1000 may include the communication manager 140.

In some aspects, the apparatus 1000 may be configured to perform one or more operations described herein in connection with FIGS. 7A and 7B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the wireless node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the wireless node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the wireless node described in connection with FIG. 2. In some aspects, the transmission component 1004 may be co-located with the reception component 1002 in a transceiver.

The communication manager 140 (e.g., using the reception component 1002 or the transmission component 1004) may communicate, with an IAB donor, an indication associated with establishing a sidelink connection between the wireless node and an IAB node. The reception component 1002 may receive, from the IAB donor, a configuration that maps a routing identifier to a route that includes the sidelink connection between the wireless node and the IAB node. The communication manager 140 (e.g., using the reception component 1002 or the transmission component 1004) may communicate a packet including the routing identifier on the sidelink connection based at least in part on the configuration.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
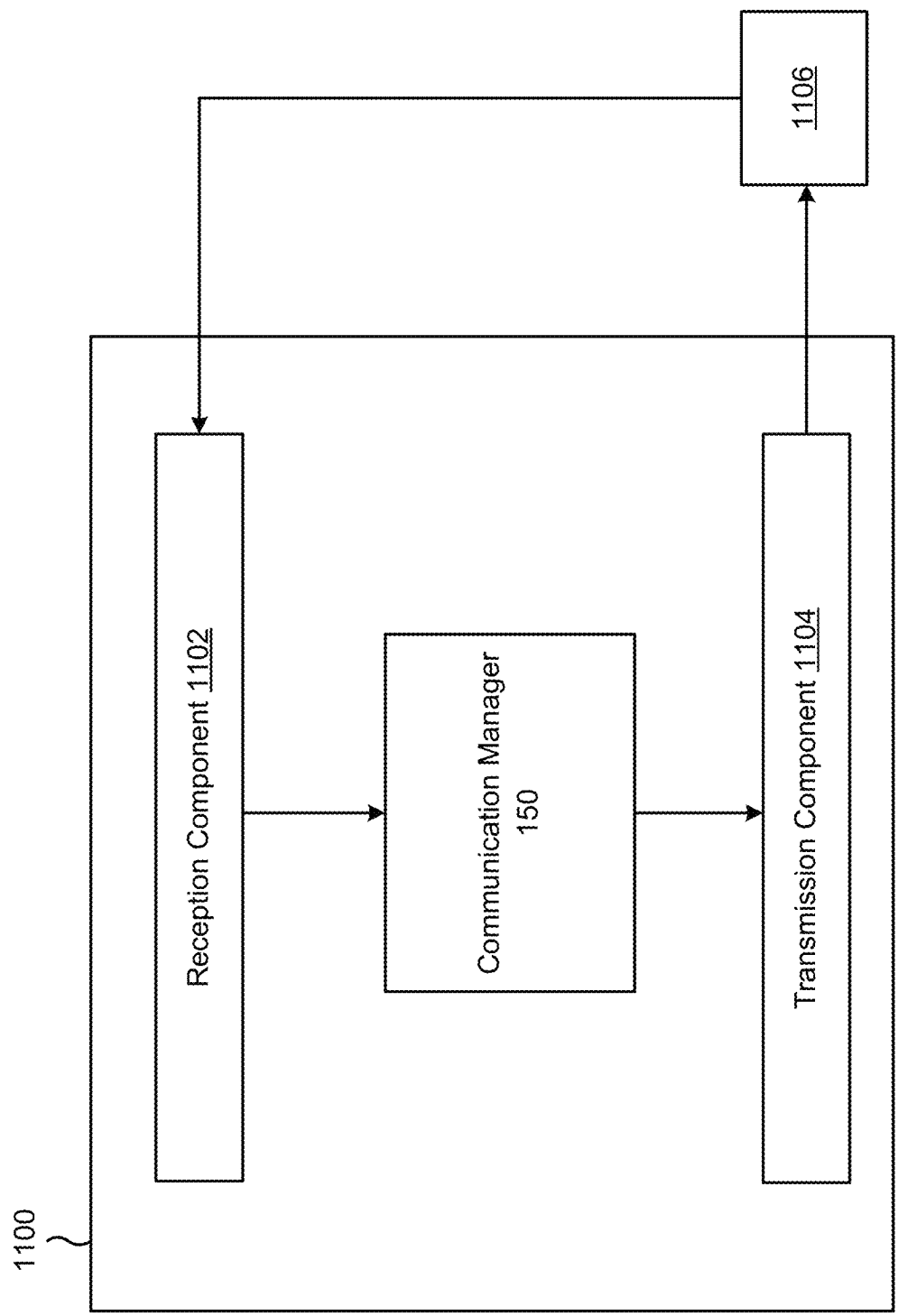

FIG. 11 is a diagram of an example apparatus 1100 for wireless communication. The apparatus 1100 may be a IAB donor, or a IAB donor may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as an IAB node, a wireless node, a UE, a base station, or another wireless communication device) using the reception component 1102 and the transmission component 1104. As further shown, the apparatus 1100 may include the communication manager 150.

In some aspects, the apparatus 1100 may be configured to perform one or more operations described herein in connection with FIGS. 7A and 7B. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the IAB donor described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the IAB donor described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the IAB donor described in connection with FIG. 2. In some aspects, the transmission component 1104 may be co-located with the reception component 1102 in a transceiver.

The communication manager 150 (e.g., using the reception component 1102 or the transmission component 1104) may communicate, with a wireless node, an indication associated with establishing a sidelink connection between the wireless node and an IAB node. The transmission component 1104 may transmit, to the wireless node, a configuration that maps a routing identifier to a route that includes the sidelink connection between the wireless node and the IAB node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless node, comprising: communicating, with an IAB donor, an indication associated with establishing a sidelink connection between the wireless node and an IAB node; and receiving, from the IAB donor, a configuration that maps a routing identifier to a route that includes the sidelink connection between the wireless node and the IAB node.

Aspect 2: The method of Aspect 1, wherein communicating the indication associated with establishing the sidelink connection between the wireless node and the IAB node comprises transmitting an indication that the sidelink connection between the wireless node and the IAB node has been established.

Aspect 3: The method of any of Aspects 1-2, wherein communicating the indication associated with establishing the sidelink connection between the wireless node and the IAB node comprises receiving an indication to establish the sidelink connection between the wireless node and the IAB node.

Aspect 4: The method of any of Aspects 1-3, further comprising communicating a packet including the routing identifier on the sidelink connection based at least in part on the configuration.

Aspect 5: The method of any of Aspects 1-4, wherein the route includes a second connection between the wireless node and a second IAB node, and the configuration indicates a mapping between the sidelink connection and the second connection.

Aspect 6: The method of Aspect 5, wherein the second connection is a Uu link connection.

Aspect 7: The method of Aspect 5, wherein the second connection is a second sidelink connection.

Aspect 8: The method of any of Aspects 5-7, wherein the sidelink connection is an egress link of the wireless node and the second connection is an ingress link of the wireless node.

Aspect 9: The method of any of Aspects 5-7, wherein the sidelink connection is an ingress link of the wireless node and the second connection is an egress link of the wireless node.

Aspect 10: The method of any of Aspects 1-9, wherein the configuration is a BAP configuration.

Aspect 11: The method of any of Aspects 1-10, wherein the routing identifier includes at least one of a BAP routing identifier, a BAP address, or a BAP path identifier.

Aspect 12: The method of any of Aspects 1-11, wherein the configuration identifies the sidelink connection using a destination identity associated with the IAB node.

Aspect 13: The method of Aspect 12, further comprising receiving an indication of the destination identity associated with the IAB node.

Aspect 14: The method of any of Aspects 1-13, wherein the configuration indicates a mapping of a traffic type to the routing identifier.

Aspect 15: The method of any of Aspects 1-14, wherein the configuration indicates a mapping to or from a channel of a plurality of channels associated with the sidelink connection.

Aspect 16: The method of Aspect 15, wherein the mapping is associated with a traffic type.

Aspect 17: The method of any of Aspects 15-16, wherein the mapping is associated with a channel of a second connection between the wireless node and a second IAB node.

Aspect 18: The method of any of Aspects 1-17, wherein the route further comprises a Uu link connection.

Aspect 19: The method of any of Aspects 1-18, wherein the wireless node is another IAB node.

Aspect 20: The method of any of Aspects 1-18, wherein the wireless node is a user equipment.

Aspect 21: The method of any of Aspects 1-18, wherein the wireless node is a base station.

Aspect 22: The method of any of Aspects 1-21, wherein the configuration is received via radio resource control (RRC) signaling.

Aspect 23: The method of any of Aspects 1-21, wherein the configuration is received via an F1 interface.

Aspect 24: The method of any of Aspects 1-23, wherein the route includes a second connection between the wireless node and the IAB node and the configuration does not indicate that either the sidelink connection or the second connection is to be used for the route, and the method further comprises: communicating a packet including the routing identifier on at least one of the sidelink connection or the second connection.

Aspect 25: The method of any of Aspects 1-23, wherein the route includes a second connection between the wireless node and the IAB node and the configuration indicates that at least one of the sidelink connection or the second connection is to be used for the route, and the method further comprises: communicating a packet including the routing identifier on the at least one of the sidelink connection or the second connection according to the configuration.

Aspect 26: A method of wireless communication performed by an IAB donor, comprising: communicating, with a wireless node, an indication associated with establishing a sidelink connection between the wireless node and an IAB node; and transmitting, to the wireless node, a configuration that maps a routing identifier to a route that includes the sidelink connection between the wireless node and the IAB node.

Aspect 27: The method of Aspect 26, wherein communicating the indication associated with establishing the sidelink connection between the wireless node and the IAB node comprises receiving an indication that the sidelink connection between the wireless node and the IAB node has been established.

Aspect 28: The method of any of Aspects 26-27, wherein communicating the indication associated with establishing the sidelink connection between the wireless node and the IAB node comprises transmitting an indication to establish the sidelink connection between the wireless node and the IAB node.

Aspect 29: The method of any of Aspects 26-28, wherein the route includes a second connection between the wireless node and a second IAB node, and the configuration indicates a mapping between the sidelink connection and the second connection.

Aspect 30: The method of Aspect 29, wherein the second connection is a Uu link connection.

Aspect 31: The method of Aspect 29, wherein the second connection is a second sidelink connection.

Aspect 32: The method of any of Aspects 29-31, wherein the sidelink connection is an egress link of the wireless node and the second connection is an ingress link of the wireless node.

Aspect 33: The method of any of Aspects 29-31, wherein the sidelink connection is an ingress link of the wireless node and the second connection is an egress link of the wireless node.

Aspect 34: The method of any of Aspects 26-33, wherein the configuration is a BAP configuration.

Aspect 35: The method of Aspect 34, wherein the routing identifier includes at least one of a BAP routing identifier, a BAP address, or a BAP path identifier.

Aspect 36: The method of any of Aspects 26-35, wherein the configuration identifies the sidelink connection using a destination identity associated with the IAB node.

Aspect 37: The method of Aspect 36, further comprising transmitting an indication of the destination identity associated with the IAB node.

Aspect 38: The method of any of Aspects 26-37, wherein the configuration indicates a mapping of a traffic type to the routing identifier.

Aspect 39: The method of any of Aspects 26-38, wherein the configuration indicates a mapping to or from a channel of a plurality of channels associated with the sidelink connection.

Aspect 40: The method of Aspect 39, wherein the mapping is associated with a traffic type.

Aspect 41: The method of any of Aspects 39-40, wherein the mapping is associated with a channel of a second connection between the wireless node and a second IAB node.

Aspect 42: The method of any of Aspects 26-41, wherein the route further comprises a Uu link connection.

Aspect 43: The method of any of Aspects 26-42, wherein the wireless node is another IAB node.

Aspect 44: The method of any of Aspects 26-42, wherein the wireless node is a user equipment.

Aspect 45: The method of any of Aspects 26-42, wherein the wireless node is a base station.

Aspect 46: The method of any of Aspects 26-45, wherein the configuration is transmitted via RRC signaling.

Aspect 47: The method of any of Aspects 26-45, wherein the configuration is transmitted via an F1 interface.

Aspect 48: The method of any of Aspects 26-46, wherein the route includes a second connection between the wireless node and the IAB node and the configuration does not indicate that either the sidelink connection or the second connection is to be used for the route.

Aspect 49: The method of any of Aspects 26-46, wherein the route includes a second connection between the wireless node and the IAB node and the configuration indicates that at least one of the sidelink connection or the second connection is to be used for the route.

Aspect 50: An apparatus for wireless communication at a device, comprising a processor; memory coupled with the processor; and instructions stored in the memory and executable by the processor to cause the apparatus to perform the method of one or more of Aspects 1-25.

Aspect 51: A device for wireless communication, comprising a memory and one or more processors coupled to the memory, the one or more processors configured to perform the method of one or more of Aspects 1-25.

Aspect 52: An apparatus for wireless communication, comprising at least one means for performing the method of one or more of Aspects 1-25.

Aspect 53: A non-transitory computer-readable medium storing code for wireless communication, the code comprising instructions executable by a processor to perform the method of one or more of Aspects 1-25.

Aspect 54: A non-transitory computer-readable medium storing a set of instructions for wireless communication, the set of instructions comprising one or more instructions that, when executed by one or more processors of a device, cause the device to perform the method of one or more of Aspects 1-25.

Aspect 55: An apparatus for wireless communication at a device, comprising a processor; memory coupled with the processor; and instructions stored in the memory and executable by the processor to cause the apparatus to perform the method of one or more of Aspects 26-49.

Aspect 56: A device for wireless communication, comprising a memory and one or more processors coupled to the memory, the one or more processors configured to perform the method of one or more of Aspects 26-49.

Aspect 57: An apparatus for wireless communication, comprising at least one means for performing the method of one or more of Aspects 26-49.

Aspect 58: A non-transitory computer-readable medium storing code for wireless communication, the code comprising instructions executable by a processor to perform the method of one or more of Aspects 26-49.

Aspect 59: A non-transitory computer-readable medium storing a set of instructions for wireless communication, the set of instructions comprising one or more instructions that, when executed by one or more processors of a device, cause the device to perform the method of one or more of Aspects 26-49.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless node for wireless communication, comprising:
   one or more memories; and
   one or more processors, coupled to the one or more memories, configured to:
   communicate, with an integrated access and backhaul (IAB) donor, an indication associated with establishing a sidelink connection between the wireless node and a first IAB node; and
   receive, from the IAB donor, a configuration that maps a routing identifier to a route that includes:
   the sidelink connection between the wireless node and the first IAB node, and
   a second connection between the wireless node and a second IAB node.

2. The wireless node of claim 1, wherein the one or more processors, to communicate the indication associated with establishing the sidelink connection between the wireless node and the first IAB node, are configured to transmit an indication that the sidelink connection between the wireless node and the first IAB node has been established.

3. The wireless node of claim 1, wherein the one or more processors, to communicate the indication associated with establishing the sidelink connection between the wireless node and the first IAB node, are configured to receive an indication to establish the sidelink connection between the wireless node and the first IAB node.

4. The wireless node of claim 1, wherein the one or more processors are further configured to communicate a packet including the routing identifier on the sidelink connection based at least in part on the configuration.

5. The wireless node of claim 1, wherein the configuration indicates a mapping between the sidelink connection and the second connection.

6. The wireless node of claim 1, wherein the second connection is a Uu link connection.

7. The wireless node of claim 1, wherein the second connection is a second sidelink connection.

8. The wireless node of claim 1, wherein the sidelink connection is an egress link of the wireless node and the second connection is an ingress link of the wireless node.

9. The wireless node of claim 1, wherein the sidelink connection is an ingress link of the wireless node and the second connection is an egress link of the wireless node.

10. The wireless node of claim 1, wherein the configuration is a backhaul adaptation protocol (BAP) configuration.

11. The wireless node of claim 10, wherein the routing identifier includes at least one of a BAP routing identifier, a BAP address, or a BAP path identifier.

12. The wireless node of claim 1, wherein the configuration identifies the sidelink connection using a destination identity associated with the IAB node.

13. The wireless node of claim 12, wherein the one or more processors are further configured to receive an indication of the destination identity associated with the first IAB node.

14. The wireless node of claim 1, wherein the configuration indicates a mapping of a traffic type to the routing identifier.

15. The wireless node of claim 1, wherein the configuration indicates a mapping to or from a channel of a plurality of channels associated with the sidelink connection.

16. The wireless node of claim 15, wherein the mapping is associated with a traffic type.

17. The wireless node of claim 15, wherein the mapping is associated with a channel of the second connection.

18. The wireless node of claim 1, wherein the route further comprises a Uu link connection.

19. The wireless node of claim 1, wherein the wireless node is a third IAB node.

20. The wireless node of claim 1, wherein the wireless node is a user equipment.

21. The wireless node of claim 1, wherein the wireless node is a base station.

22. The wireless node of claim 1, wherein the configuration is received via radio resource control (RRC) signaling.

23. The wireless node of claim 1, wherein the configuration is received via an F1 interface.

24. The wireless node of claim 1, wherein the configuration does not indicate that either the sidelink connection or the second connection is to be used for the route, and the one or more processors are further to:
communicate a packet including the routing identifier on at least one of the sidelink connection or the second connection.

25. The wireless node of claim 1, wherein the configuration indicates that at least one of the sidelink connection or the second connection is to be used for the route, and the one or more processors are further to:
communicate a packet including the routing identifier on the at least one of the sidelink connection or the second connection according to the configuration.

26. An integrated access and backhaul (IAB) donor for wireless communication, comprising:
one or more memories; and
one or more processors, coupled to the one or more memories, configured to:
communicate, with a wireless node, an indication associated with establishing a sidelink connection between the wireless node and a first IAB node; and
transmit, to the wireless node, a configuration that maps a routing identifier to a route that includes:
the sidelink connection between the wireless node and the first IAB node, and
a second connection between the wireless node and a second IAB node.

27. The IAB donor of claim 26, wherein the one or more processors, to communicate the indication associated with establishing the sidelink connection between the wireless node and the first IAB node, are configured to receive an indication that the sidelink connection between the wireless node and the first IAB node has been established or transmit an indication to establish the sidelink connection between the wireless node and the first IAB node.

28. The IAB donor of claim 26, wherein the configuration indicates a mapping between the sidelink connection and the second connection.

29. A method of wireless communication performed by a wireless node, comprising:
communicating, with an integrated access and backhaul (IAB) donor, an indication associated with establishing a sidelink connection between the wireless node and a first IAB node; and
receiving, from the IAB donor, a configuration that maps a routing identifier to a route that includes:
the sidelink connection between the wireless node and the first IAB node, and
a second connection between the wireless node and a second IAB node.

30. A method of wireless communication performed by an integrated access and backhaul (IAB) donor, comprising:
communicating, with a wireless node, an indication associated with establishing a sidelink connection between the wireless node and a first IAB node; and
transmitting, to the wireless node, a configuration that maps a routing identifier to a route that includes:
the sidelink connection between the wireless node and the first IAB node, and
a second connection between the wireless node and a second IAB node.

* * * * *